United States Patent
Jourjon et al.

(10) Patent No.: US 6,556,354 B1
(45) Date of Patent: Apr. 29, 2003

(54) OPTICAL ADAPTER FOR MOUNTING CAMERA LENSES ON A VIDEO CAMERA

(75) Inventors: Bernadette Jourjon, St Etienne (FR); Jacques Debize, St Heand (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/850,741
(22) PCT Filed: Nov. 16, 1999
(86) PCT No.: PCT/FR99/02809
§ 371 (c)(1), (2), (4) Date: May 18, 2001
(87) PCT Pub. No.: WO00/30348
PCT Pub. Date: May 25, 2000

(30) Foreign Application Priority Data

Nov. 18, 1998 (FR) .................................... 98 14484

(51) Int. Cl.⁷ .......................... G02B 15/02; G03B 17/00
(52) U.S. Cl. ...................... 359/672; 359/675; 396/530
(58) Field of Search ................. 359/672–675, 359/656–661; 396/446, 544, 530; 352/79, 80

(56) References Cited

U.S. PATENT DOCUMENTS

| | | | |
|---|---|---|---|
| 4,264,151 A | 4/1981 | Okano | .................... 359/675 |
| 4,589,750 A | 5/1986 | Tomori et al. | .............. 396/508 |
| 4,807,594 A | * 2/1989 | Chatenever | ................. 359/589 |
| 5,541,686 A | * 7/1996 | Stephenson | ................. 354/141 |
| 5,726,809 A | 3/1998 | Griffith | ....................... 359/675 |

* cited by examiner

Primary Examiner—Georgia Epps
Assistant Examiner—M. Hasan
(74) Attorney, Agent, or Firm—Oblon, Spivak, McClelland, Maier & Neustadt, P.C.

(57) ABSTRACT

Optical adapter for adapting cine-camera objective to video camera, which includes spectral splitter of light into three spectral bands, and three receivers each associated with one spectral band, the three receivers having the same format, the distance between the entrance of spectral splitter and the sensitive surfaces of the receivers being different for three spectral bands. The objective is a single-image focal plane objective for all three spectral bands and has a second given format. The adapter includes first optical device conveying image between the image focal plane of the objective and the sensitive surfaces of the receivers, and second optical device achieving a relative axial offset of the three spectral bands so that the differences in distance are compensated for. The first and second optical devices have overall magnification changing the format of the image of the objective into the receiver common format.

32 Claims, 7 Drawing Sheets

OPTICAL ADAPTER FOR MOUNTING CAMERA LENSES ON A VIDEO CAMERA

BACKGROUND OF THE INVENTION

1. Field of the Invention

The invention relates to the field of optical adapters in shooting cameras. Shooting cameras can be divided, depending on their purpose, into two distinct categories, each having its advantages and its drawbacks. There are instruments for the cinema sector and instruments for the video sector. The cinema and video sectors are developing separately.

2. Description of the Related Art

Each sector remains attached to its own technology. The video sector is essentially one using electronic technology and image processing after shooting. The cinema sector is a world of actors in which the shooting conditions remain essential and where it is more difficult to achieve image processing after shooting in order to obtain special effects.

The purpose of the invention is to bring these two sectors, namely the cinema and video sectors, closer together by proposing an adapter of cine-camera objectives to video cameras to obtain a filming device that combines most of the advantages of each of these two respective sectors. With this adapter, it is possible to use existing high-performance, high-quality cine-camera objectives incorporating numerous functions with a video camera having CCD type electronic receivers. These receivers provide for easier storage and duplication as well as special effects and high-performance

SUMMARY OF THE INVENTION

According to the invention, there is provided an adapter for adapting at least one objective to a camera, characterized in that: the camera is a video camera comprising a spectral splitter of light into three spectral bands, and three receivers each associated with one spectral band, the three receivers having the same first format, the distances between the entrance of the spectral splitter and the sensitive surfaces of the receivers being different for the three spectral bands; the objective is a cine-camera objective, with only one image focal plane, for all three spectral bands and has a second given format; and in that the adapter comprises: first optical means conveying images between the image focal plane of the cine-camera objective and the sensitive surfaces of the receivers; second optical means achieving a relative axial offset of the three spectral bands so that the differences in distance are compensated for, so that the image corresponding to each of the spectral bands is formed at the level of the sensitive surface of the associated receiver; the first and second optical means of conveyance and offsetting having an overall magnification that changes the format of the image of the cine-camera objective into the common format of the receivers.

BRIEF DESCRIPTION OF THE DRAWINGS

The invention will be understood more clearly and other features and advantages shall appear from the following description and the appended drawings, given by way of examples, where.

DETAILED DESCRIPTION OF THE INVENTION

The adapter according to the invention conveys an image between the image focal plane of a cine-camera objective that has a format known as a cinema format and the sensitive surfaces of the receivers which have a common format that will be called a video format.

Figure 1:
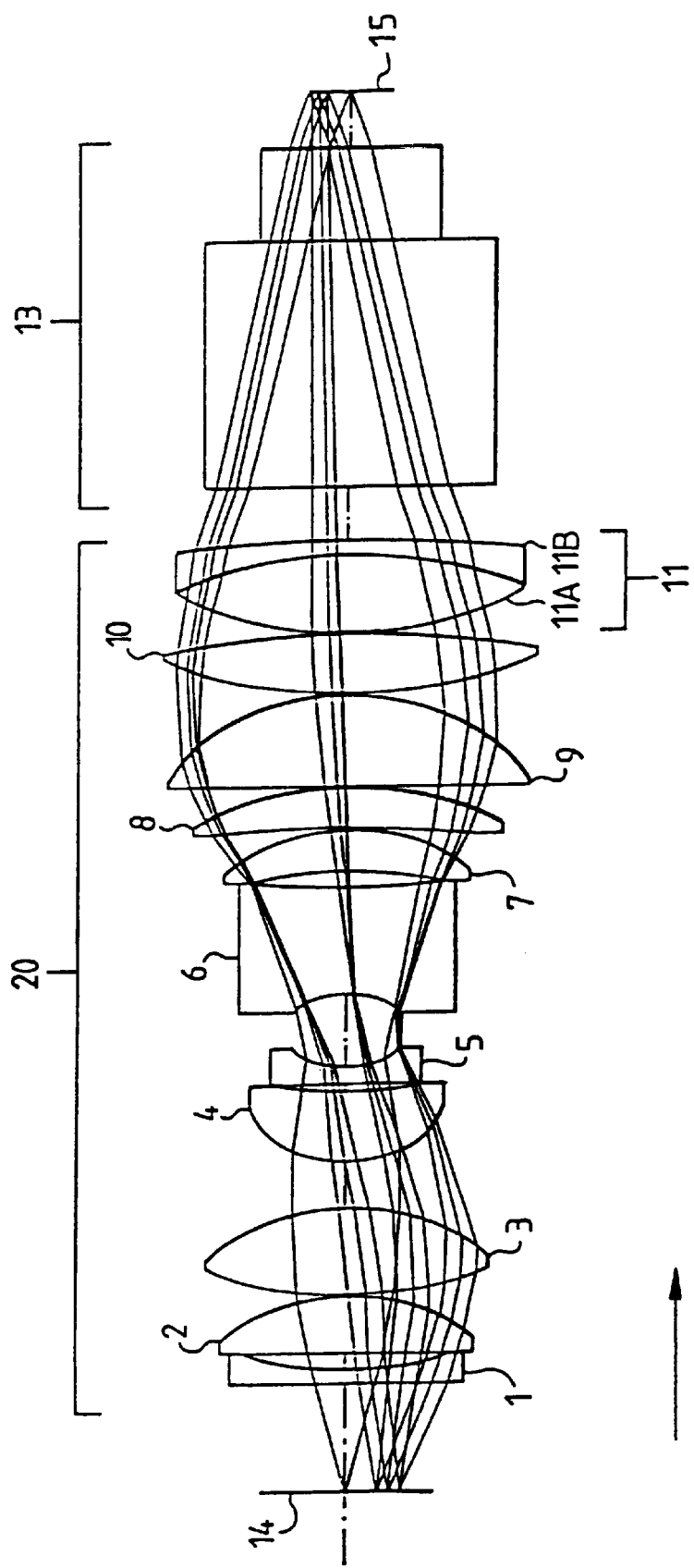
FIG. 1 shows the optical assembly of a particular embodiment of an adapter according to the invention.

The adapter according to the invention can be used to carry out, inter alia, the following conversions for example:

the conversion of an image in the "super 16 mm" cinema format corresponding to a useful image diagonal equal to 14.36 mm into a ⅔" (two-thirds of an inch) video format image, namely a format corresponding to a useful image diagonal of 11 mm. The magnification ratio is equal to −0.77 or +0.77, depending on whether the image of inverted or not at the receivers. The distances for the spectral bands between the entrance of the spectral splitter and the sensitive surfaces of the receivers are offset with respect to one another by +27 $\mu$m between the red band and the green band and by −9 $\mu$m between the blue band and the green band. A particular embodiment of the adapter according to the invention, used to carry out this conversion, is shown in FIG. 1 described in detail here below.

the conversion of an image in a 35 mm cinema format corresponding to a useful image diagonal equal to 27.2 mm into a video ⅔" format image corresponding to a useful image diagonal equal to 11 mm. The magnification ratio is equal to −0.404 or +0.404. The distances for the spectral bands between the entrance of the spectral splitter and the sensitive surfaces of the receivers are offset with respect to each other by +27 $\mu$m between the red band and the green band and by −9 $\mu$m between the blue band and the green band.

The adapter according to the invention can also be used to carry out, inter alia, the following conversions:

the conversion of an image in a 35 mm cinema format corresponding to a useful image diagonal equal to 27.2 mm into a video 1" format image corresponding to a useful image diagonal equal to 16 mm. The magnification ratio is equal to −0.588 or +0.588. The distances for the spectral bands between the image focal plane of the objective and the sensitive surfaces of the receivers are offset with respect to each other by +30 $\mu$m between the red band and the green band and by +10 $\mu$m between the blue band and the green band;

the conversion of an image in the "Super 35 mm" cinema format corresponding to a useful image diagonal equal to 31.1 mm into a video 1" format image corresponding to a useful image diagonal equal to 11 mm. The magnification ratio is equal to −0.35 or +0.35. The distances for the spectral bands between the image focal plane of the objective and the sensitive surfaces of the receivers are offset with respect to each other by +27 $\mu$m between the red band and the green band and by −9 $\mu$m between the blue band and the green band;

the conversion of an image in the "Super 35 mm" cinema format corresponding to a useful image diagonal equal to 31.1 mm into a video ⅔" format image corresponding to a useful image diagonal equal to 16 mm. The magnification ratio is equal to −0.51 or +0.51. The distances for the spectral bands between the image focal plane of the objective and the sensitive surfaces of the receivers are offset with respect to each other by +30 μm between the red band and the green band and by +10 μm between the blue band and the green band;

the conversion of an image in the "Super 16 mm" cinema format corresponding to a useful image diagonal equal to 14.36 mm into a 1" video format image, namely a format corresponding to a useful image diagonal of 16 mm. The magnification ratio is equal to −1.11 or +1.11. The distances for the spectral bands between the image focal plane of the objective on the one hand and the sensitive surfaces of the receivers on the other hand are offset with respect to each other by +30 μm between the red band and the green band and by +10 μm between the blue band and the green band;

the conversion of an image in the "16 mm" cinema format corresponding to a useful image diagonal equal to 12.8 mm into a ⅔" video format image, namely a format corresponding to a useful image diagonal of 11 mm. The magnification ratio is equal to −0.86 or +0.86. The distances for the spectral bands between the image focal plane of the objective on the one hand and the sensitive surfaces of the receivers on the other hand are offset with respect to each other by +27 μm between the red band and the green band and by −9 μm between the blue band and the green band;

the conversion of an image in the "16 mm" cinema format corresponding to a useful image diagonal equal to 12.8 mm into a 1" video format image, namely a format corresponding to a useful image diagonal of 16 mm. The magnification ratio is equal to −1.25 or +1.25. The distances for the spectral bands between the image focal plane of the objective on the one hand and the sensitive surfaces of the receivers on the other hand are offset with respect to each other by +30 μm between the red band and the green band and by +10 μm between the blue band and the green band.

FIG. 1 shows the optical assembly of a particular embodiment of an adapter 20 according to the invention used to obtain the conversion described here above of a "Super 16 mm" cinema format image into a ⅔" video format image. The light is propagated from the left to the right of FIG. 1, its direction of propagation being represented by an arrow, the entrance and the exit of the optical assembly being located respectively to the left and to the right of FIG. 1. The direction of propagation of light shall be considered in the upstream-to-downstream direction. For the sake of the clarity of the figure, the light rays, shown in solid lines, have been drawn only for the 530 nm center wavelength of the green spectral band.

The optical assembly of the adapter 20 consists of the elements 1 to 11, the element 13 roughly representing the spectral splitter located downline from the adapter 20, the splitter 13 not belonging to the optical assembly of the adapter 20. The plane 14 corresponds to the image focal plane of the cine-camera objective and the surface 15 corresponds to the sensitive surface of the receiver of the green spectral band. Only the sensitive surface 15 for the green spectral band has been shown, for reasons of clarity of the figure. The image corresponding to the green spectral band is formed at the level of the sensitive surface 15 of the associated receiver which is not shown in FIG. 1. The optimum would be for this image to be formed exactly on the surface 15. This is also the case for the other spectral bands, namely the red and blue band. The elements 1 to 11 are separated by air thicknesses.

Figure 6:
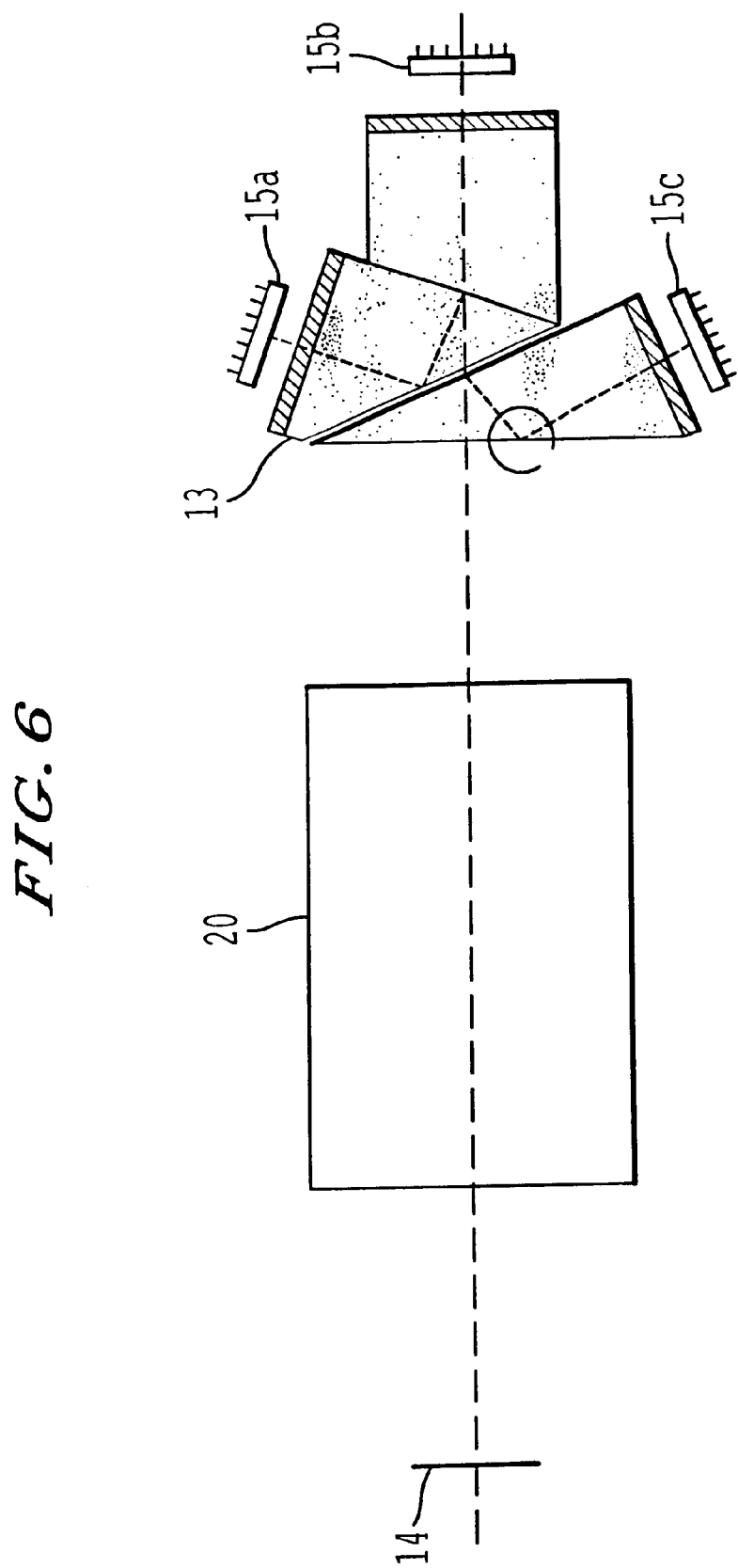
FIG. 6 shows a spectral splitter and three receivers for the three spectral bands.

FIG. 6 shows in more detail how the light coming from the adapter 14 is split in the green, red, and blue spectral bands by the spectral splitter 13. Further, each band is directed to a corresponding sensitive surface, 15A–15C.

The cine-camera objective is usually an objective with small extension.

Preferably, the optical assembly of the adapter 20 sequentially comprises a diverging element 1, three converging elements 2 to 4, two diverging elements 5 and 6, four converging elements 7 to 10, and one converging doublet 11 successively constituted by a converging element 11A and a diverging element 11B.

More specifically, this optical assembly sequentially comprises, along an optical axis 18:

located at a distance from the plane 14 that is substantially equal to 14.8 mm, a diverging lens 1 made of glass with an index $n_{d1}$ substantially equal to 1.61659 having a thickness at the center substantially equal to 1.5 mm, its entrance and exit diopters being substantially equal respectively to 740.887 mm and 50.815 mm;

located at a distance from the lens 1 substantially equal to 2.1 mm (the exit diopter of the lens 1 and the entrance diopter of the lens 2 are therefore separated by a distance of 2.1 mm), a converging lens 2 made of glass with an index $n_{d2}$ substantially equal to 1.744 having a thickness at the center substantially equal to 7.9 mm, its entrance and exit diopters being substantially equal respectively to 480.641 mm and 28.906 mm;

located at a distance from the lens 2 substantially equal to 0.2 mm, a biconvex converging lens 3 made of glass with an index $n_{d3}$ substantially equal to 1.43875 having a thickness at the center substantially equal to 11.9 mm, its entrance and exit diopters being substantially equal respectively to 51.55 mm and 30.199 mm;

located at a distance from the lens 3 substantially equal to 6.1 mm, a converging lens 4 made of glass with an index $n_{d3}$ substantially equal to 1.43875 having a thickness at the center substantially equal to 10 mm, its entrance and exit diopters being substantially equal respectively to 15.628 mm and 72.017 mm;

located at a distance from the lens 4 substantially equal to 0.7 mm, a diverging lens 5 made of glass with an index $n_{d4}$ substantially equal to 1.65412 having a thickness at the center substantially equal to 2 mm, its entrance and exit diopters being substantially equal respectively to 1899 mm and 10.366 mm;

located at a distance from the lens 5 substantially equal to 10.3 mm, a diverging lens 6 made of glass with an index $n_{d5}$ substantially equal to 1.6445 having a thickness at the center substantially equal to 15 mm, its entrance and exit diopters being substantially equal respectively to 12.358 mm and 193.507 mm;

located at a distance from the lens 6 substantially equal to 1.8 mm, a converging meniscus 7 made of glass with an index $n_{d3}$ substantially equal to 1.43875 having a thickness at the center substantially equal to 5.9 mm, its entrance and exit diopters being substantially equal respectively to 76.431 mm and 27.347 mm;

located at a distance from the meniscus 7 substantially equal to 0.1 mm, a converging meniscus 8 made of glass with an index $n_{d3}$ substantially equal to 1.43875 having a thickness at the center substantially equal to 5.7 mm, its entrance and exit diopters being substantially equal respectively to 259.277 mm and 44.997 mm;

located at a distance from the meniscus 8 substantially equal to 0.1 mm, a converging biconvex lens 9 made of glass with an index $n_{d3}$ substantially equal to 1.43875 having a thickness at the center substantially equal to 12.8 mm, its entrance and exit diopters being substantially equal respectively to 3344.1 mm and 31.713 mm;

located at a distance from the lens 8 substantially equal to 0.1 mm, a converging biconvex lens 10 made of glass with an index $n_{d3}$ substantially equal to 1.43875 having a thickness at the center substantially equal to 8.4 mm, its entrance and exit diopters being substantially equal respectively to 68.697 mm and 123.96 mm;

located at a distance from the lens 10 substantially equal to 0.1 mm, a converging doublet 11 formed by a converging biconvex lens 11A made of glass with an index $n_{d3}$ substantially equal to 1.43875 having a thickness at the center equal to 11.2 mm, the radii of its entrance and exit diopters being substantially equal respectively to 51.951 mm and 56.886 mm, joined by bonding to a diverging lens 11B made of glass with an index $n_{d6}$ substantially equal to 1.717 having a thickness at the center equal to 1.5 mm, the radii of its entrance and exit diopters being substantially equal respectively to 56.886 mm and 197.954 mm.

The indices $n_{d1}$ to $n_{d6}$ correspond to a wavelength of 586 nm.

The surface 15 is located substantially at 61.25 mm from the exit diopter of the doublet 11, in the presence of the splitter 13. The distance between the plane 14 and the surface 15 is substantially equal to 191.456 mm. The optical extension of the adapter 20 when there is no splitter 13 is substantially equal to 44.92 mm.

In order to maintain the initial quality of the image reaching the plane 14 on the surface 15, the adapter 20 preferably sets up the condition of pupil conjugation, namely:

firstly, the light flux crossing the exit pupil of the cine-camera objective also crosses the entrance pupil of the adapter. The optimum condition would be for the exit pupil of the cine-camera objective to be contained in the entrance pupil of the adapter 20.

secondly, the exit pupil of the adapter (20) is rejected to a distance sufficient so that the variation of incidence of the light rays reaching the dichroic planes is smaller than a given angular tolerance. This tolerance is equal for example to two degrees. The optimum would be to reject the exit pupil of the adapter to infinity. This would correspond to zero angular tolerance, namely a constant angle of incidence.

Preferably, the position of the entrance pupil of the adapter 20 is substantially located at the position of the exit pupil of the cine-camera objective not shown in FIG. 1. The optimum condition would be to have the two pupils in one and the same plane, herein perpendicular to the optical axis 18.

This pupil conjugation can be obtained by means of optical elements 1 to 11 that are fixed, as in FIG. 1. This approach has the advantage of simplicity of embodiment.

Pupil conjugation can also be obtained by means of an optical assembly comprising mobile optical elements whose relative position is continually adjustable. This approach can then be used to obtain an adapter 20 to adapt cine-camera objectives of different formats to one and the same video camera. Since this approach is, however, costlier than the approach using fixed elements, a compromise between cost and the properties of the optical assembly may be obtained with an optical assembly comprising optical elements whose relatives position is discretely adjustable.

Advantageously, the optical assembly of the adapter 20 is a centered system of purely dioptric elements.

Preferably, the optical assembly of the adapter 20 achieves an image reversal between the plane 14 on the surface 15. The optical assembly is then shorter than it is when there is no reversal.

In FIG. 1, the optical assembly has an aperture substantially equal to F/1.4 with F being the focal length of the optical assembly. Preferably, the aperture of the adapter 20 is substantially equal to the aperture of the splitter 13. This prevents the appearance of geometrical vignetting in the optical assembly of the adapter 20.

Furthermore, inasmuch as the splitter (13) of the video camera has geometrical and/or chromatic aberrations, the optical assembly preferably corrects these aberrations.

The preferred spectral domain of use of the adapter 20 is the domain of the visible, namely a spectral domain ranging for example from 400 to 700 nm.

FIGS. 2 to 5H show simulations performed with the adapter 20 of FIG. 1, showing the excellent optical performance characteristics of the adapter according to the invention.

Figure 2:
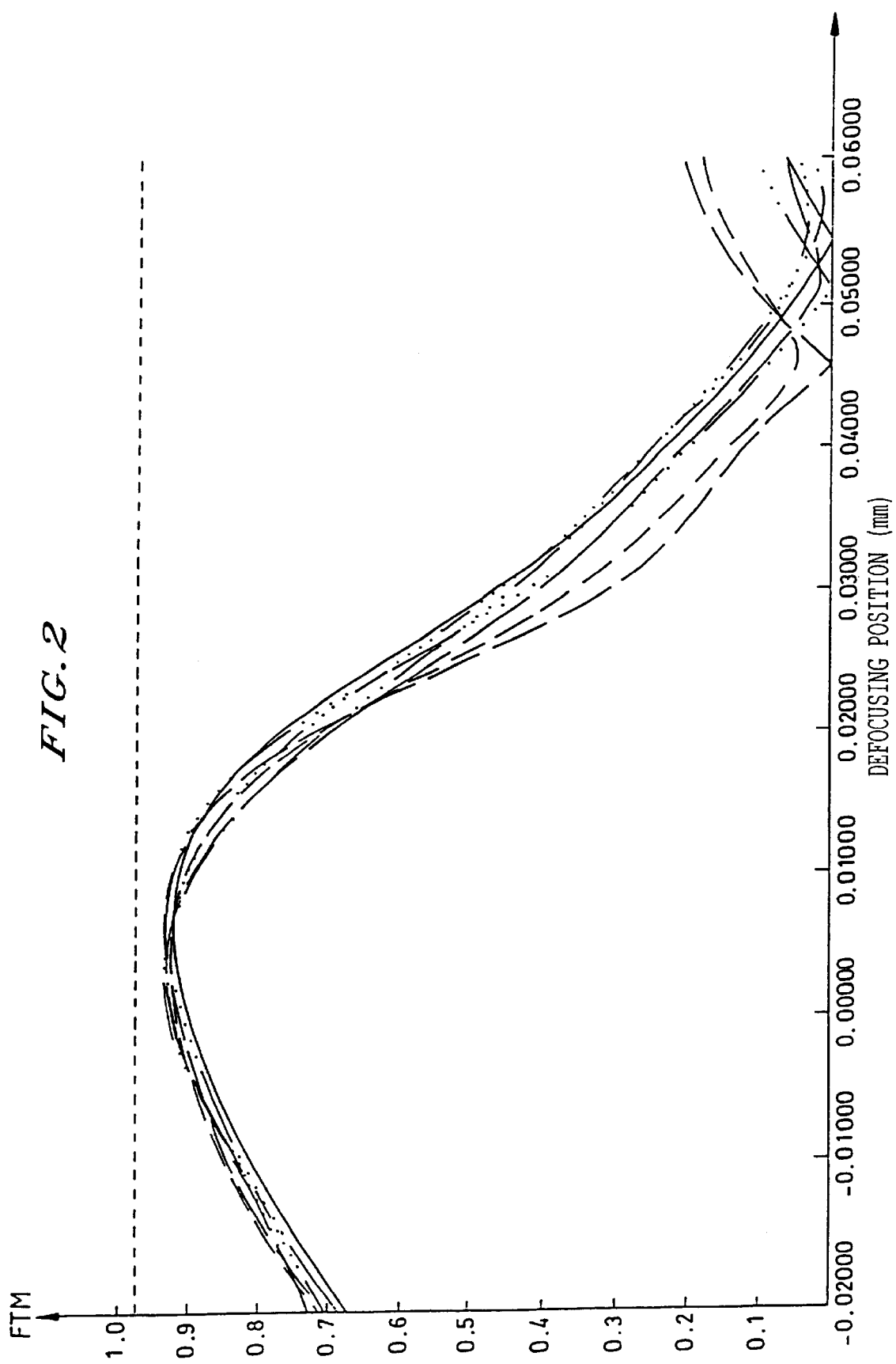
FIGS. 2 to 4 shows the MTF of the adapter described in FIG. 1, as a function of the defocusing position with respect to the paraxial extension, respectively for the green, red and blue spectral bands.
Figure 3:
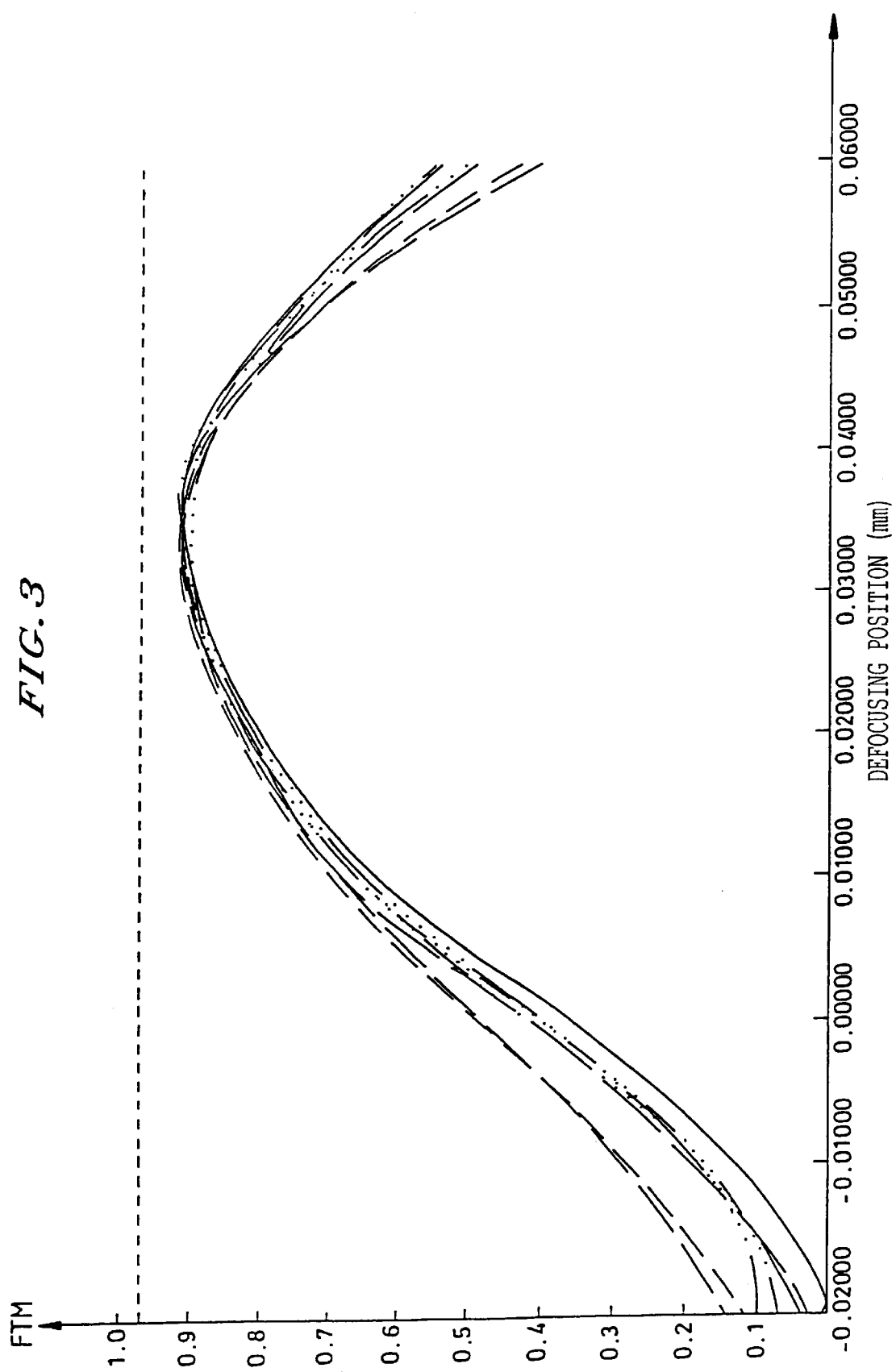
Figure 4:
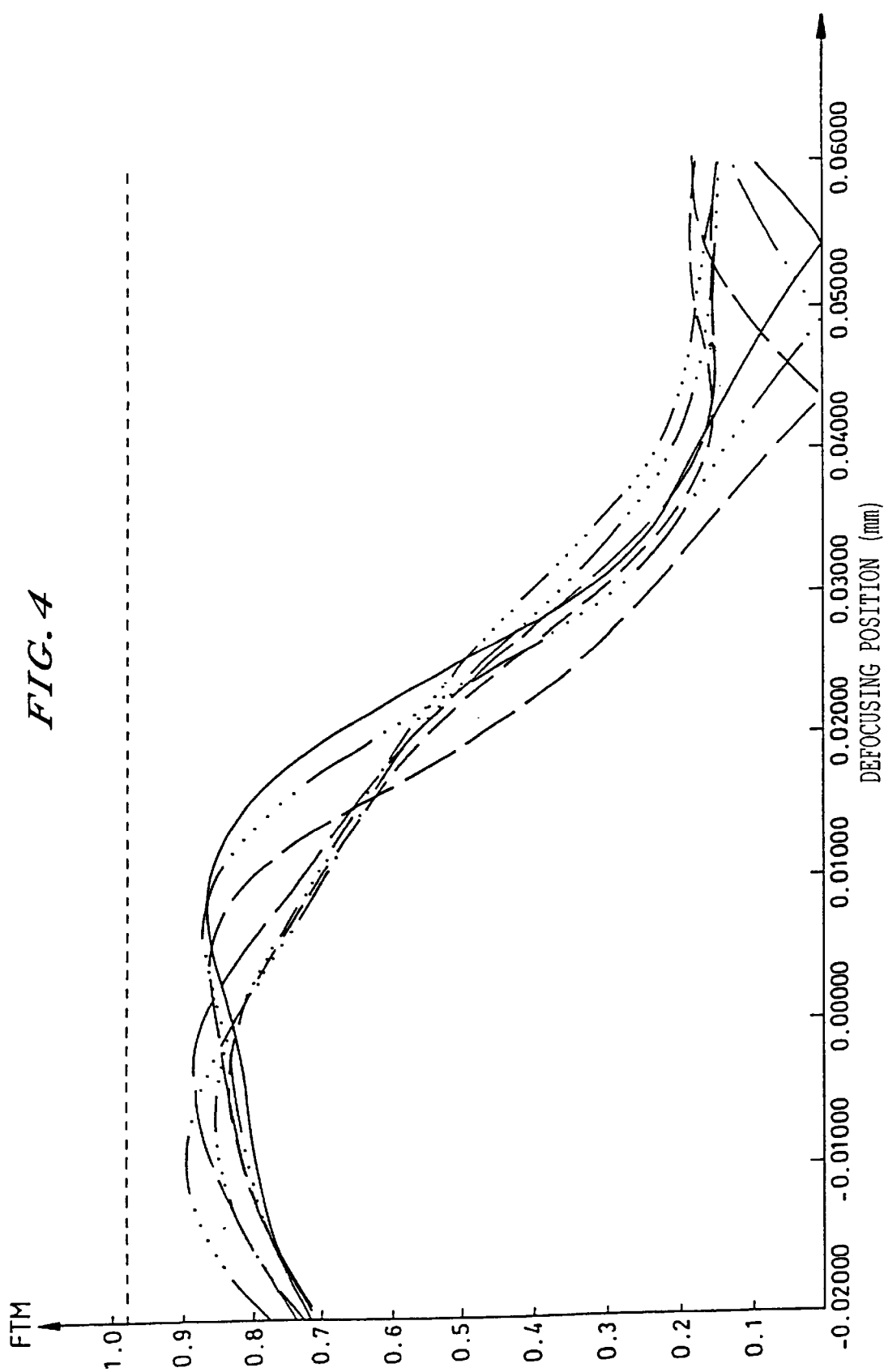
Figure 5B:
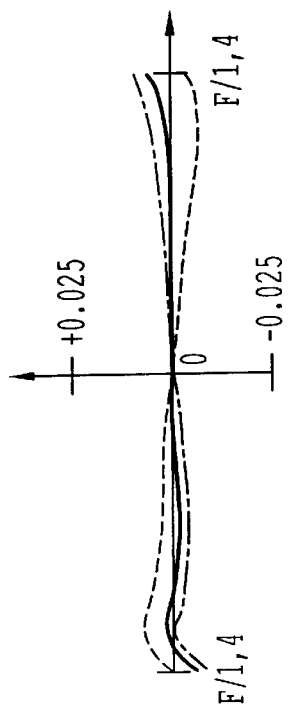
FIGS. 5A to 5H shows curves of aberrations for different points of the field, for the green spectral band of the adapter described in FIG. 1.
Figure 5D:
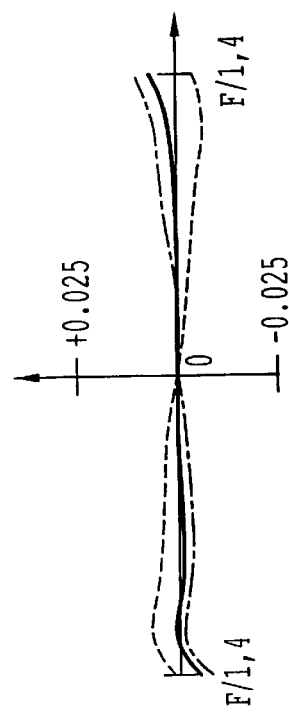
Figure 5A:
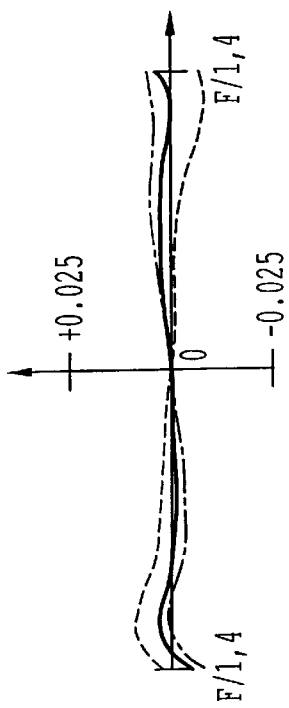
Figure 5C:
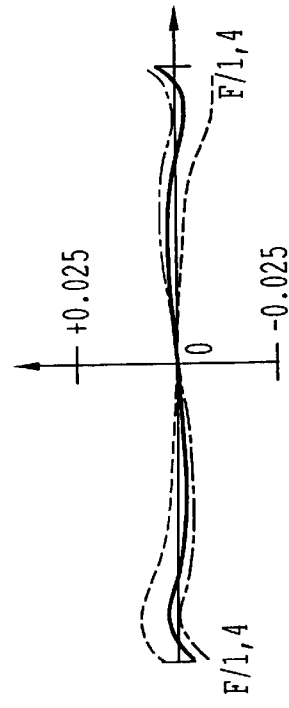
Figure 5F:
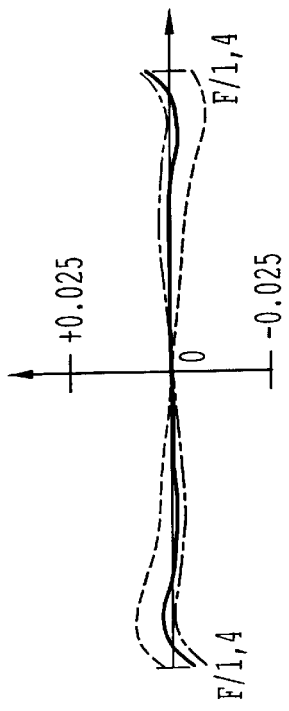
Figure 5H:
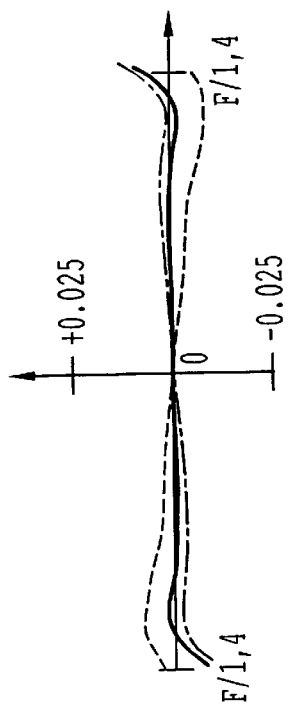
Figure 5E:
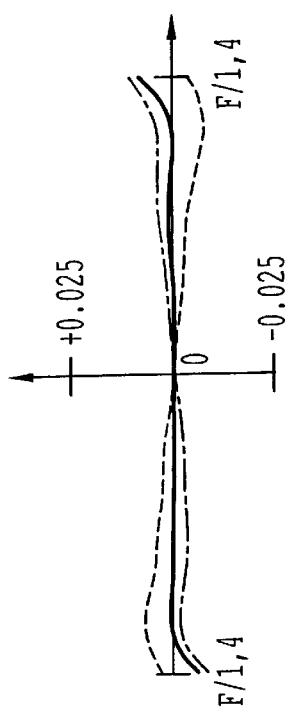
Figure 5G:
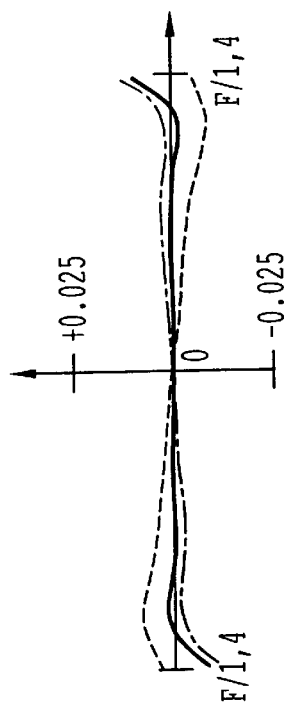

FIGS. 2 to 4 give a view, respectively for the green, red and blue spectral bands, of the MTF or modulation transfer function of the optical assembly, as a function of the defocusing position with respect to the paraxial extension of the optical assembly. The defocusing serves for focusing on different points in the field, in two directions X and Y, orthogonal to each other and to the optical axis 18. The MTF is a crenellated pattern MTF at a frequency equal herein to 40 cycles per mm. The frequency used corresponds to the cut-off frequency of the receivers located downline from the splitter 13. The defocusing position is expressed in mm.

In FIGS. 2 to 4:

the diffraction limit, equal in the directions Y and X, is plotted with double lines of dashes;

the curves in the directions Y and X for the center of the field having angular coordinates of 0 degrees in the direction Y and 0 degrees in the direction X are respectively plotted in solid lines and dot-and-dash lines with one dot between the dashes. Here the two curves are merged and only the solid-lined curve can be seen;

the curves in the directions Y and X for a point of the field having angular coordinates of 0 degrees in the direction Y and −4.01 degrees in the direction X are respectively plotted in large dashes and dot-and-dash lines with six dots between the dashes;

the curves in the directions Y and X for a point of the field having angular coordinates of −7.09 degrees in the direction Y and 0 degrees in the direction X are respectively plotted in medium-sized dashes and dot-and-dash lines with five dots between the dashes;

the curves in the directions Y and X for a point of the field having angular coordinates of −7.09 degrees in the direction Y and −4.01 degrees in the direction X are respectively plotted in small dashes and dot-and-dash lines with four dots between the dashes;

FIG. 2 pertains to the green spectral band. The green spectral band results from a weighted mean between the following wavelengths: 580 nm with the coefficient 1; 530 nm with the coefficient 2; 500 nm with the coefficient 1. A very high MTF of over 0.9, is obtained for all the points considered in the field, for a defocusing of 0.01 mm.

FIG. 3 pertains to the red spectral band. The red spectral band results from a weighted mean between the following wavelengths: 640 nm with the coefficient 1; 600 nm with the coefficient 2; 570 nm with the a coefficient 1. A very high MTF of over 0.9, is obtained for all the points considered in the field, for a defocusing of 0.037 mm, namely 27 μm more than in the case of the green spectral band.

FIG. 4 pertains to the blue spectral band. The blue spectral band results from a weighted mean between the following wavelengths: 485 nm with the coefficient 1; 440 nm with the coefficient 2; 410 nm with the coefficient 1. A high MTF of over 0.8, is obtained for all the points considered in the field, for a defocusing of 0.001 mm, namely 9 μm less than in the case of the green spectral band.

The group of FIGS. 5A to 5H gives a view, for a green spectral band, of the aberration curves as a function of the aperture varying from a zero aperture on the optical axis 18 shown in FIG. 1, to the maximum aperture on either side of the optical axis 18, in the directions Y and X for various points in the field. The zero aperture is referenced zero in the figures and the maximum aperture is herein equal to F/1.4. The results are equivalent for the other spectral bands, namely the red and the blue.

the curves A and B represent these aberrations curves, along the directions Y and X, with reference to the center of the field having angular coordinates of 0 degrees in the direction Y and 0 degrees in the direction X;

the curves C and D represent these aberrations curves, along the directions Y and X, with reference to the point of the field having angular coordinates of 0 degrees in the direction Y and −4.01 degrees in the direction X;

the curves E and F represent these aberrations curves, along the directions Y and X, with reference to the point of the field having angular coordinates of −7.09 degrees in the direction Y and 0 degrees in the direction X;

the curves G and H represent these aberrations curves, along the directions Y and X, with reference to the point of the field having angular coordinates corresponding to −7.09 degrees in the direction Y and −4.01 degrees in the direction X.

In each of the FIGS. 5A to 5H, three aberration curves corresponding to the three wavelengths taking part in the weighted mean of the green spectral band defined in FIG. 2 are shown: the highest wavelength is shown in dashes, the lowest wavelength is shown in dots and dashes, and the median wavelength is shown in solid lines. In each of these figures, the aberration is on the y-axis and the aperture on the x-axis. In each of these figures, the ranges, referenced by small perpendicular lines at the axes, are equal to ±0.025 mm on the y-axis for the aberration, F/1.4 on either side of the point of origin 0 on the x-axis of figures A, B, F, D, E, F, G, H.

In all the above FIGS., 5A to 5H, it has been seen that the aberrations have a value that remains low.

What is claimed is:

1. An adapter for adapting at least one objective to a camera, wherein the camera is a video camera comprising a spectral splitter of light into three spectral bands, and three receivers each associated with one spectral band, the three receivers having a same first format, distances between an entrance of the spectral splitter and sensitive surfaces of the receivers being different for the three spectral bands;

the objective is a cine-camera objective with only one image focal plane for all three spectral bands and has a second given format;

and in that the adapter comprises:

first optical means conveying images between an image focal plane of the cine-camera objective and the sensitive surfaces of the receivers;

second optical means achieving a relative axial offset of the three spectral bands so that the differences in distance are compensated for, so that an image corresponding to each of the spectral bands is formed at a level of the sensitive surface of the associated receiver;

said first and second optical means of conveyance and offsetting having an overall magnification that changes the format of the image of the cine-camera objective into a common format of the receivers.

2. Adapter according to claim 1, wherein the objective has low extension.

3. Adapter according to the claim 1, having an entrance pupil and an exit pupil, the spectral splitter comprising dichroic planes, wherein light flux crossing the exit pupil of the cine-camera objective also crosses the entrance pupil of the adapter;

the exit pupil of the adapter is rejected to a distance far enough for a variation of an incidence of the light rays reaching the dichroic planes to be smaller than a given angular tolerance.

4. Adapter according to claim 3, wherein a position of the entrance pupil of the adapter is substantially located at a position of the exit pupil of the cine-camera objective.

5. Adapter according to claim 1, wherein the first and second optical means are formed by fixed optical elements.

6. Adapter according to claim 1, wherein the first and second optical means comprise mobile optical elements whose relative position is discretely adjustable.

7. Adapter according to claim 1, wherein the first and second optical means comprise mobile optical elements whose relative position is continuously adjustable.

8. Adapter according to claim 1, wherein the first and second optical means are constituted by a centered system of purely dioptric elements.

9. Adapter according to claim 1, wherein the first and second optical means invert the image between the image focal plane of the cine-camera objective and the sensitive surfaces of the receivers.

10. Adapter according to claim 1, wherein an aperture of the adapter is substantially equal to an aperture of the spectral splitter.

11. Adapter according to claim 1, wherein, with the splitter of the video camera having geometrical and/or chromatic aberrations, the first and second optical means correct these aberrations.

12. Adapter according to claim 1, wherein the three spectral bands belong to a spectral domain ranging from 400 to 700 nanometers.

13. Adapter according to claim 1, wherein the format of the image of the cine-camera objective is a 35 mm format and the format of the receivers is a ⅔ inch format.

14. Adapter according to claim 1, wherein the format of the image of the cine-camera objective is a Super 16 mm format and the format of the receivers is a ⅔ inch format.

15. Adapter according to claim 1, wherein the first and second optical means comprise sequentially a diverging element, three converging elements, two diverging elements, four converging elements, and a converging doublet successively formed by a converging element and a diverging element.

16. Adapter according to claim 15, wherein values of the indices $n_{d1}$ to $n_{d6}$ are given for a wavelength equal to 586 manometers, the first and second optical means comprise sequentially:

a first diverging lens made of glass with an index $n_{d1}$ substantially equal to 1.61659 and having a thickness at a center substantially equal to 1.5 mm, its entrance and exit diopters being substantially equal respectively to 740.887 mm and 50.815 mm;

a first distance between said image focal plane and said first diverging lens substantially equal to 2.1 mm;

a first converging lens made of glass with an index $n_{d2}$ substantially equal to 1.744 and having a thickness at a center substantially equal to 7.9 mm, its entrance and exit diopters being substantially equal respectively to 480.641 mm and 28.906 mm;

a second distance between said first diverging lens and said first converging lens substantially equal to 0.2 mm;

a first biconvex converging lens made of glass with an index $n_{d3}$ substantially equal to 1.43875 and having a thickness at a center substantially equal to 11.9 mm, its entrance and exit diopters being substantially equal respectively to 51.55 mm and 30.199 mm;

a third distance between said first converging lens and said first biconvex converging lens substantially equal to 6.1 mm;

a second converging lens made of glass with an index $n_{d3}$ substantially equal to 1.43875 and having a thickness at a center substantially equal to 10 mm, its entrance and exit diopters being substantially equal respectively to 15.628 mm and 72.017 mm;

a fourth distance between said first biconvex converging lens and said second converging lens substantially equal to 0.7 mm;

a second diverging lens made of glass with an index $n_{d4}$ substantially equal to 1.65412 and having a thickness at a center substantially equal to 2 mm, its entrance and exit diopters being substantially equal respectively to 1899 mm and 10.366 mm;

a fifth distance between said second converging lens and said second diverging lens substantially equal to 10.3 mm;

a third diverging lens made of glass with an index $n_{d5}$ substantially equal to 1.6445 and having a thickness at a center substantially equal to 15 mm, its entrance and exit diopters being substantially equal respectively to 12.358 mm and 193.507 mm;

a sixth distance between said second diverging lens and said third diverging lens substantially equal to 1.8 mm;

a first converging meniscus made of glass with an index $n_{d3}$ substantially equal to 1.43875 and having a thickness at a center substantially equal to 5.9 mm, its entrance and exit diopters being substantially equal respectively to 76.431 mm and 27.347 mm;

a seventh distance between said third diverging lens and said first converging meniscus substantially equal to 0.1 mm;

a second converging meniscus made of glass with an index $n_{d3}$ substantially equal to 1.43875 and having a thickness at the center substantially equal to 5.7 mm, its entrance and exit diopters being substantially equal respectively to 259.277 mm and 44.997 mm;

an eighth distance between said first converging meniscus and said second converging meniscus substantially equal to 0.1 mm;

a second converging biconvex lens made of glass with an index $n_{d3}$ substantially equal to 1.43875 and having a thickness at a center substantially equal to 12.8 mm, its entrance and exit diopters being substantially equal respectively to 3344.1 mm and 31.713 mm;

a ninth distance between said second converging meniscus and second converging biconvex lens substantially equal to 0.1 mm;

a third converging biconvex lens made of glass with an index $n_{d3}$ substantially equal to 1.43875 and having a thickness at a center substantially equal to 8.4 mm, its entrance and exit diopters being substantially equal respectively to 68.697 mm and 123.96 mm;

a tenth between said second converging biconvex lens and said third converging biconvex lens substantially equal to 0.1 mm; and a converging doublet formed by a fourth converging biconvex lens made of glass with an index $n_{d3}$ substantially equal to 1.43875 and having a thickness at a center equal to 11.2 mm, a radii of its entrance and exit diopters being substantially equal respectively to 51.951 mm and 56.886 mm, joined by bonding to a fourth diverging lens made of glass with an index $n_{ds}$ substantially equal to 1.717 and having a thickness at a center equal to 1.5 mm, a radii of its entrance and exit diopters being substantially equal respectively to 56.886 mm and 197.954 mm.

17. Adapter according to claim 15, wherein values of the indices $n_{d1}$ to $n_{d6}$ are given for a wavelength equal to 586 manometers, the first and second optical units comprise sequentially:

a first diverging lens made of glass with an index $n_{d1}$ substantially equal to 1.61659 and having a thickness at a center substantially equal to 1.5 mm, its entrance and exit diopters being substantially equal respectively to 740.887 mm and 50.815 mm;

a first distance between said image focal plane and said first diverging lens substantially equal to 2.1 mm;

a first converging lens made of glass with an index $n_{d2}$ substantially equal to 1.744 and having a thickness at a center substantially equal to 7.9 mm, its entrance and exit diopters being substantially equal respectively to 480.641 mm and 28.906 mm;

a second distance between said first diverging lens and said first converging lens substantially equal to 0.2 mm;

a first biconvex converging lens made of glass with an index $n_{d3}$ substantially equal to 1.43875 and having a thickness at a center substantially equal to 11.9 mm, its entrance and exit diopters being substantially equal respectively to 51.55 mm and 30.199 mm;

a third distance between said first converging lens and said first biconvex converging lens substantially equal to 6.1 mm;

a second converging lens made of glass with an index $n_{d3}$ substantially equal to 1.43875 and having a thickness at a center substantially equal to 10 mm, its entrance and exit diopters being substantially equal respectively to 15.628 mm and 72.017 mm;

a fourth distance between said first biconvex converging lens and said second converging lens substantially equal to 0.7 mm;

a second diverging lens made of glass with an index $n_{d4}$ substantially equal to 1.65412 and having a thickness at a center substantially equal to 2 mm, its entrance and exit diopters being substantially equal respectively to 1899 mm and 10.366 mm;

a fifth distance between said second converging lens and said second diverging lens substantially equal to 10.3 mm;

a third diverging lens made of glass with an index $n_{d5}$ substantially equal to 1.6445 and having a thickness at a center substantially equal to 15 mm, its entrance and exit diopters being substantially equal respectively to 12.358 mm and 193.507 mm;

a sixth distance between said second diverging lens and said third diverging lens substantially equal to 1.8 mm;

a first converging meniscus made of glass with an index $n_{d3}$ substantially equal to 1.43875 and having a thickness at a center substantially equal to 5.9 mm, its entrance and exit diopters being substantially equal respectively to 76.431 mm and 27.347 mm;

a seventh distance between said third diverging lens and said first converging meniscus substantially equal to 0.1 mm;

a second converging meniscus made of glass with an index $n_{d3}$ substantially equal to 1.43875 and having a thickness at the center substantially equal to 5.7 mm, its entrance and exit diopters being substantially equal respectively to 259.277 mm and 44.997 mm;

an eighth distance between said first converging meniscus and said second converging meniscus substantially equal to 0.1 mm;

a second converging biconvex lens made of glass with an index $n_{d3}$ substantially equal to 1.43875 and having a thickness at a center substantially equal to 12.8 mm, its entrance and exit diopters being substantially equal respectively to 3344.1 mm and 31.713 mm;

a ninth distance between said second converging meniscus and second converging biconvex lens substantially equal to 0.1 mm;

a third converging biconvex lens made of glass with an index $n_{d3}$ substantially equal to 1.43875 and having a thickness at a center substantially equal to 8.4 mm, its entrance and exit diopters being substantially equal respectively to 68.697 mm and 123.96 mm;

a tenth between said second converging biconvex lens and said third converging biconvex lens substantially equal to 0.1 mm; and a converging doublet formed by a fourth converging biconvex lens made of glass with an index $n_{d3}$ substantially equal to 1.43875 and having a thickness at a center equal to 11.2 mm, a radii of its entrance and exit diopters being substantially equal respectively to 51.951 mm and 56.886 mm, joined by bonding to a fourth diverging lens made of glass with an index $n_{ds}$ substantially equal to 1.717 and having a thickness at a center equal to 1.5 mm, a radii of its entrance and exit diopters being substantially equal respectively to 56.886 mm and 197.954 mm.

18. An adapter for adapting at least one objective to a camera, wherein the camera is a video camera comprising a spectral splitter of light into three spectral bands, and three receivers each associated with one spectral band, the three receivers having a same first format, distances between an entrance of the spectral splitter and sensitive surfaces of the receivers being different for the three spectral bands;

the objective is a cine-camera objective with only one image focal plane for all three spectral bands and has a second given format;

and the adapter comprises:

a first optical unit configured to convey images between an image focal plane of the cine-camera objective and the sensitive surfaces of the receivers;

a second optical unit configured to achieve a relative axial offset of the three spectral bands so that the differences in distance are compensated for, so that an image corresponding to each of the spectral bands is formed at a level of the sensitive surface of the associated receiver, wherein said first and second optical units have an overall magnification that changes the format of the image of the cine-camera objective into a common format of the receivers.

19. Adapter according to claim 18, wherein the objective has low extension.

20. Adapter according to the claim 18, having an entrance pupil and an exit pupil, the spectral splitter comprising dichroic planes, wherein light flux crossing the exit pupil of the cine-camera objective also crosses the entrance pupil of the adapter;

the exit pupil of the adapter is rejected to a distance far enough for a variation of an incidence of the light rays reaching the dichroic planes to be smaller than a given angular tolerance.

21. Adapter according to claim 20, wherein a position of the entrance pupil of the adapter is substantially located at a position of the exit pupil of the cine-camera objective.

22. Adapter according to claim 18, wherein the first and second optical units are formed by fixed optical elements.

23. Adapter according to claim 18, wherein the first and second optical units comprise mobile optical elements whose relative position is discretely adjustable.

24. Adapter according to claim 18, wherein the first and second optical units comprise mobile optical elements whose relative position is continuously adjustable.

25. Adapter according to claim 18, wherein the first and second optical units are constituted by a centered system of purely dioptric elements.

26. Adapter according to claim 18, wherein the first and second optical units invert the image between the image focal plane of the cine-camera objective and the sensitive surfaces of the receivers.

27. Adapter according to claim 18, wherein an aperture of the adapter is substantially equal to an aperture of the spectral splitter.

28. Adapter according to claim 18, wherein, with the splitter of the video camera having geometrical and/or chromatic aberrations, the first and second optical units correct these aberrations.

29. Adapter according to claim 18, wherein the three spectral bands belong to a spectral domain ranging from 400 to 700 nanometers.

30. Adapter according to claim 18, wherein the format of the image of the cine-camera objective is a 35 mm format and the format of the receivers is a ⅔ inch format.

31. Adapter according to claim 18, wherein the format of the image of the cine-camera objective is a Super 16 mm format and the format of the receivers is a ⅔ inch format.

32. Adapter according to claim 18, wherein the first and second optical units comprise sequentially a diverging element, three converging elements, two diverging elements, four converging elements, and a converging doublet successively formed by a converging element and a diverging element.

* * * * *